Patented Oct. 19, 1954

2,692,272

UNITED STATES PATENT OFFICE 2,692,272

1,4-DIAMINO-2,3-ANTHRAQUINONE-DICARBOXAMIDES

Melvin A. Perkins, Wilmington, Del., assignor to E. I. du Pont de Nemours and Company, Wilmington, Del., a corporation of Delaware No Drawing. Application December 5, 1951, Serial No. 260,085

5 Claims. (Cl. 260—377)

This invention relates to the preparation of new compounds, more particularly 1,4-diamino-2,3-anthraquinone-dicarboxamides, which are especially useful as dyes for the new polyethylene terephthalate fiber known generally as "Dacron" fiber.

As pointed out in the J. Soc. Dyers & Colourists, 1946, page 348, the discovery of dyes which are suitable for the coloring of the new polyethylene terephthalate fiber, and the various methods for the application of these dyes, has presented a real problem. See also American Dyestuff Reporter, 1948, page 699. Blue dyes of satisfactory application and fastness properties have been particularly difficult to find for use not only in the dyeing of this new fiber but in the dyeing of many of the older and now commonly used fibers, and the need for a blue dye for this new polyethylene terephthalate fiber has been discussed in the American Dyestuff Reporter of January 1951, page 54, under the dyeing of "Fiber V."

It is an object of the present invention to provide new compounds of the anthraquinone series, and more particularly 1,4-diamino-2,3-anthraquinone-dicarboxamides, which are applicable to the coloring of the new polyethylene terephthalate fibers now known as "Dacron."

The new compounds of the present invention have the following general formula:

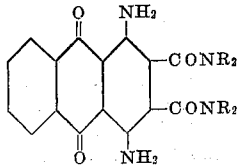

in which the R's on the amide nitrogens stand for substituents of the group consisting of -H, -alkyl and -hydroxyalkyl, the total number of carbon atoms in both R's attached to a single amide nitrogen being not more than four.

The following examples are given to illustrate this invention. The parts used are by weight.

Example 1

A mixture of 17 parts of 1,4-diamino-2,3-anthraquinone-dicarboxylic acid, 150 parts of nitrobenzene and 42 parts of thionyl chloride was heated with stirring to 125° C. and kept at 125° C. for 2½ hours. The blue solution became red. Dried air was passed through the solution for 20 minutes and the temperature was lowered to 90° C. Ammonia gas was passed through the solution at 90° C. until no more ammonia was adsorbed, and the mixture was stirred at 90° C. for an additional hour. The solution was cooled to room temperature and 250 parts of alcohol was added to precipitate the dye. The dye was separated by filtration and washed with alcohol and then hot water and dried. The 1,4-diamino-2,3-anthraquinone-dicarboxamide of the formula:

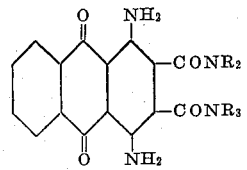

obtained has a melting point over 300° C. and dyes "Dacron" fiber in greenish-blue shades having good light-fastness.

Example 2

1,4-diamino-N,N'-bis(2-hydroxyethyl)-2,3-anthraquinone-dicarboxamide was prepared by the method of Example 1 from 17 parts of 1,4-diamino-2,3-anthraquinone-dicarboxylic acid, 150 parts of nitrobenzene, 42 parts of thionyl chloride and 60 parts of ethanolamine. The carboxamide compound of the formula:

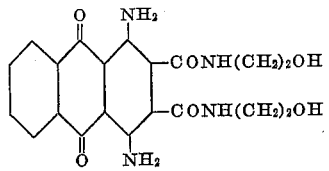

was obtained in 70% yield and had a melting point of from 285° to 294° C. The compound dyed "Dacron" fiber a greenish-blue color which had excellent light-fastness on Fade-Ometer exposure.

Example 3

1,4 - diamino - N,N' - tetrakis(2 - hydroxyethyl) - 2,3 - anthraquinone - dicarboxamide was prepared by the method of Example 1 from 33 parts of 1,4-diamino-2,3-anthraquinone-dicarboxylic acid, 300 parts of nitrobenzene, 48 parts of thionyl chloride and 75 parts if diethanolamine. The 1,4-diamino-2,3-anthraquinone-dicarboxamide of the formula:

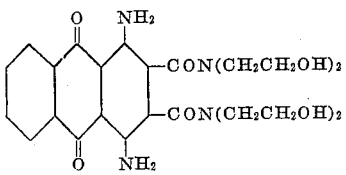

which was obtained in 25% yield, had a melting point of over 300° C. Nitrogen analysis showed 10.92% N (theory for $C_{24}H_{28}O_8N_4$, N=11.20%). This compound dyed "Dacron" fiber a greenish-blue color which had very good light-fastness on Fade-Ometer exposure.

*Example 4*

1,4 - diamino - N,N' - dimethyl - 2,3-anthraquinone-dicarboxamide was prepared by the method of Example 1 from 22 parts of 1,4-diamino-2,3-anthraquinone-dicarboxylic acid, 32 parts of thionyl chloride and 220 parts of ortho-dichlorobenzene. In this example, methylamine was passed into the reaction mixture instead of ammonia. The 1,4-diamino-2,3-anthraquinone-dicarboxamide of the formula:

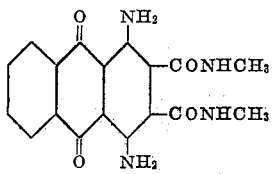

was obtained in nearly quantitative yield. The compound dyed "Dacron" fiber a greenish-blue color which had good light fastness on Fade-Ometer exposure.

Instead of the ammonia or other amine employed in the specific examples above given, any of the alkylamines or hydroxy-alkylamines such as ethylamine, the propylamines, butylamines, dimethylamine, ethylethanolamine, methylpropylamine or mixtures of any of the amines may be substituted therefor to produce compounds which dye the new polyethylene terephthalate fiber in blue shades having good light-fastness properties.

Instead of the particular solvents such as nitrobenzene or ortho-dichlorobenzene, any obvious equivalent thereof such as chlorobenzene, trichlorobenzene or other inert organic solvents having a boiling point sufficiently high to permit temperatures such as those illustrated in the examples, may of course be employed.

These 1,4 - diamino - 2,3 - anthraquinone - dicarboxamides all exhibit sufficiently good affinity and penetration for the new polyester fiber to make them commercially useful for that purpose. Their fastness to light when applied to this new polyester fiber ranges from good to excellent.

I claim:

1. 1,4 - diamino - 2,3 - anthraquinone - dicarboxamides of the general formula:

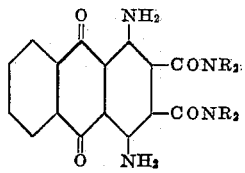

in which the R's on the amide nitrogens stand for substituents of the group consisting of -H, -alkyl and -monohydroxyalkyl, the total number of carbon atoms in both R's attached to a single amide nitrogen being not more than four.

2. The 1,4 - diamino - 2,3 - anthraquinone-dicarboxamide of the formula:

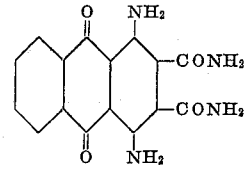

3. The 1,4 - diamino - 2,3 - anthraquinone-dicarboxamide of the formula:

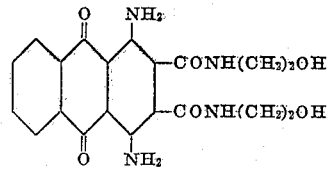

4. The 1,4 - diamino - 2,3 - anthraquinone-dicarboxamide of the formula:

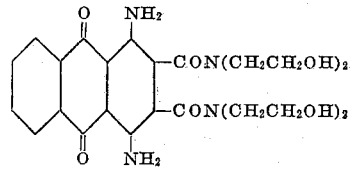

5. The 1,4 - diamino - 2,3 - anthraquinone-dicarboxamide of the formula:

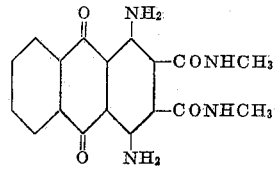

References Cited in the file of this patent

UNITED STATES PATENTS

| Number | Name | Date |
|---|---|---|
| 1,871,821 | Nawiasky et al. | Aug. 16, 1932 |
| 2,174,245 | Krause et al. | Sept. 26, 1939 |
| 2,176,437 | Runne et al. | Oct. 17, 1939 |
| 2,242,760 | Schoeller et al. | May 20, 1941 |
| 2,294,968 | Ellis et al. | Sept. 8, 1942 |